United States Patent
Prasad

(10) Patent No.: US 11,721,698 B2
(45) Date of Patent: Aug. 8, 2023

(54) SPLIT STACK TRIPLE HEIGHT CELL

(71) Applicant: Taiwan Semiconductor Manufacturing Company, Ltd., Hsinchu (TW)

(72) Inventor: Guru Prasad, Austin, TX (US)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 211 days.

(21) Appl. No.: 17/148,652

(22) Filed: Jan. 14, 2021

(65) Prior Publication Data

US 2021/0327878 A1   Oct. 21, 2021

Related U.S. Application Data

(60) Provisional application No. 63/012,304, filed on Apr. 20, 2020.

(51) Int. Cl.
| | | |
|---|---|---|
| *H01L 27/092* | (2006.01) | |
| *G06F 30/392* | (2020.01) | |
| *G06F 117/12* | (2020.01) | |
| *G06F 119/06* | (2020.01) | |

(52) U.S. Cl.
CPC ........ *H01L 27/0924* (2013.01); *G06F 30/392* (2020.01); *G06F 2117/12* (2020.01); *G06F 2119/06* (2020.01)

(58) Field of Classification Search
CPC . H01L 27/0924; G06F 30/392; G06F 2117/12
See application file for complete search history.

(56) References Cited

U.S. PATENT DOCUMENTS

2018/0150592 A1*   5/2018   Chang ................... G06F 30/392

FOREIGN PATENT DOCUMENTS

| CN | 1722439 | 1/2006 |
|---|---|---|
| TW | 201816991 | 5/2008 |
| TW | 201947588 | 12/2019 |
| TW | 202001897 | 1/2020 |

OTHER PUBLICATIONS

Taiwanese office action, application No. 110113380, dated Apr. 25, 2022.

* cited by examiner

*Primary Examiner* — Nelson Garces
(74) *Attorney, Agent, or Firm* — Jones Day

(57) ABSTRACT

Split stack triple height cells and methods of generating layouts of same are described herein. The structure includes a circuit formed within three stacked rows. The circuit includes a first stage having a first plurality of electrical components and a second stage having a second plurality of electrical components. The first row includes a first electrical component of the first plurality of electrical components within a top portion of the first row. A first electrical component of the second plurality of electrical components is within a bottom portion of the first row and a top portion of the second row. A second electrical component of the second plurality of electrical components is within a top portion of the third row and a bottom portion of the second row. A second electrical component of the first plurality of electrical components is within a bottom portion of the third row.

20 Claims, 11 Drawing Sheets

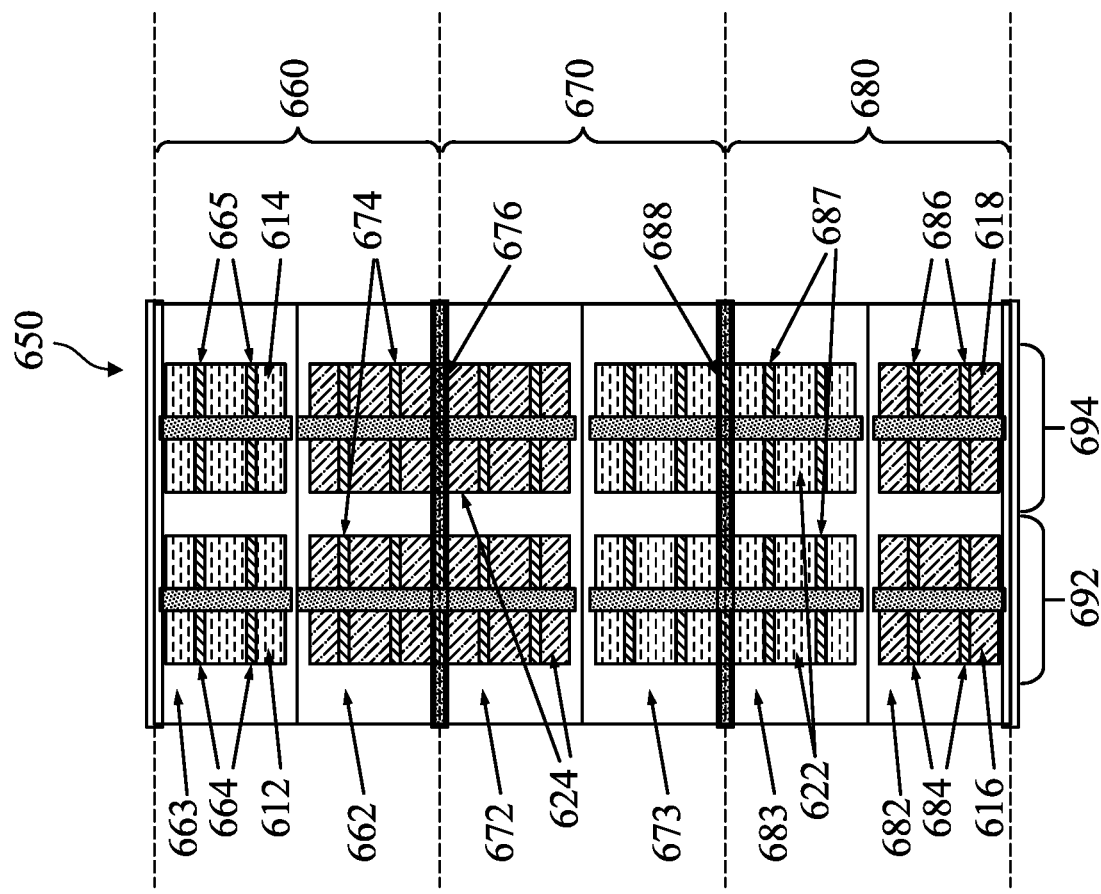
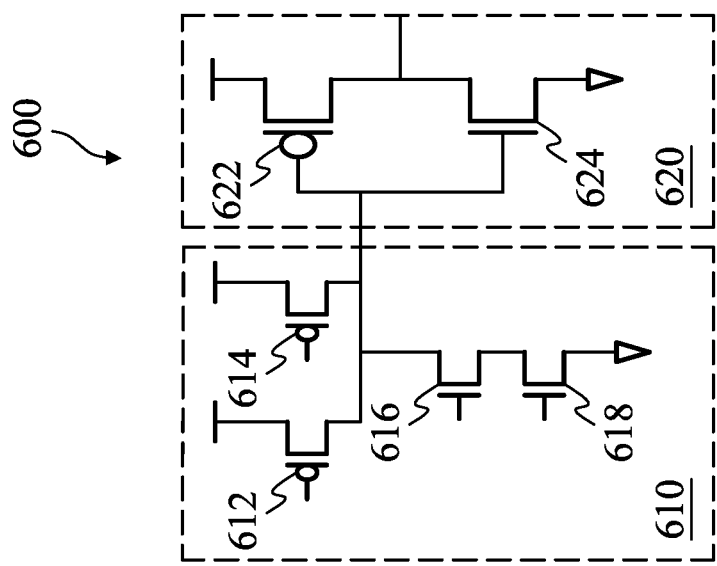
FIG. 6B
FIG. 6A

SPLIT STACK TRIPLE HEIGHT CELL

PRIORITY CLAIM

This application claims priority to U.S. Application No. 63/012,304, filed Apr. 20, 2020, the contents of which is incorporated by reference herein in its entirety.

FIELD

The technology described in this disclosure relates generally to device layouts and more particularly to split stack triple height cell.

BACKGROUND

Electronic Design Automation (EDA) and related tools enable efficient design of complex integrated circuits which may have extremely large numbers of components (e.g., thousands, millions, billions, or more). Specifying characteristics and placement of all of those components (e.g., transistor arrangements to implement desired logic, types of transistors, signal routing) by hand would be extremely time consuming and expensive for modern integrated circuits, if not impossible. Modern EDA tools utilize cells to facilitate circuit design at different levels of abstraction. A cell in the context of EDA is an abstract representation of a component within a physical device layout of an electronic circuit in software. Circuits may be designed using cells, where those circuits may then be implemented using lower level specifications (e.g., transistor arrangement, signal routing) associated with those cells. Standard libraries are used to design electronic circuits, enabling power-performance-area (PPA) optimization.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 6A illustrates another exemplary two-stage transistor level schematic of an AND gate that can be implemented in a split stack triple height cell in accordance with various embodiments of the present disclosure.

FIG. 6B illustrates an example device layout of an AND gate of FIG. 6A implemented within a split stack triple height cell in accordance with various embodiments of the present disclosure.

DETAILED DESCRIPTION

Figure 1A:
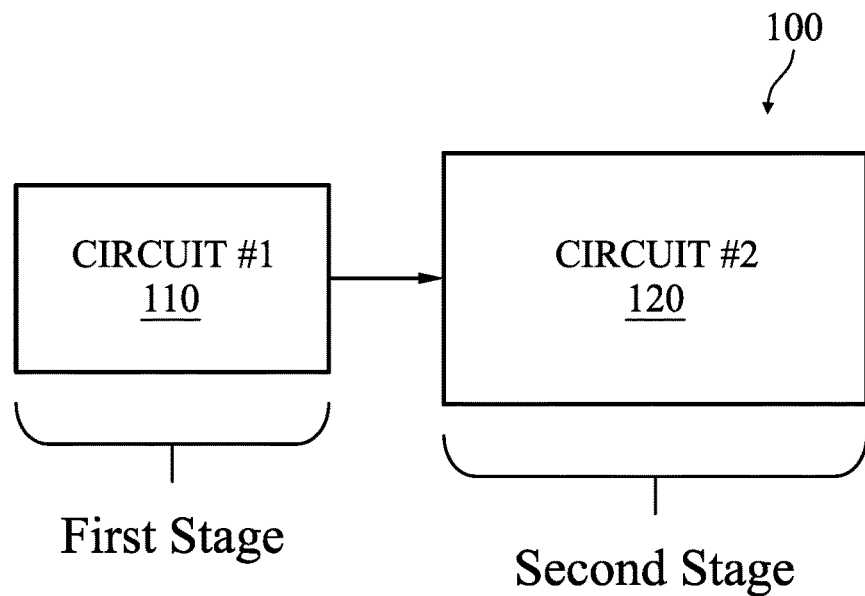
FIG. 1A illustrates a block diagram of an exemplary electronic device implemented with staged circuits in accordance with various embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

An Integrated Circuit (IC) is a complex network of a very large number of components (e.g., transistors, resistors, and capacitors) interconnected using the features of a process technology to realize a desired function. Manually designing such a component is typically not feasible because of the number of steps involved and the amount of design information that needs to be processed. EDA tools may be used to assist the designers in this process. Due to the size and complex nature of the design process, the IC may be designed using a hierarchical approach where the design is broken down in smaller pieces which are assembled to form the complete chip. This process also helps in pre-designing commonly used sub-blocks and reusing them where needed. A standard cell library is one such collection of basic components (e.g., AND, OR, NAND, NOR, XOR, flip-flops, latches) commonly used by certain EDA tools to automate the generation of layout from a behavioral description of a block. Each piece of design may have an abstract representation for the various information that is needed to capture the design such as functional behavior, circuit description, physical layout, timing behavior, many of which are used by the EDA tools to assist in the design process.

EDA tools may use a library of standard cells associated with common circuit functions. For example, standard cells can be associated logic gates, such as an AND gate, an OR gate, an XOR gate, a NOT gate, a NAND gate, a NOR gate, or an XNOR gate, and circuits such as a multiplexer, a flip-flop, an adder, or a counter. Those standard cells can be arranged to realize more complex integrated circuit (IC) functions. When designing an IC having specific functions, standard cells may be selected. Designers, EDA software, and/or Electronic Computer-Aided Design (ECAD) tools can draw out design layouts of the integrated circuit including the selected standard cells and/or non-standard cells. The design layouts may be converted to photomasks. Then, semiconductor integrated circuits can be manufactured, when patterns of various rows, defined by the photomasks, are transferred to a substrate. More specifically, in addition to describing the functional operation of a cell, a standard cell may also include definition of components to realize that function as well as an arrangement of those components in a physical integrated circuit. Those components may be arranged in a single plane, or in some instances, the components may be stacked vertically over multiple rows to minimize integrated circuit area.

A digital IC consists of a large network of basic logical gates like AND, OR, NAND, NOR, EXOR, etc. A Standard cell library is a collection of these types of basic logical gates implemented in any given process technology. CAD tools are used to generate the IC layout from a behavioral description of the needed functionality. These CAD tools use the components from the standard cell library to realize the desired function. A cell in the standard cell library could be a basic logic gate implemented as a single stage CMOS circuit or multiple stages in which the output of one CMOS stage it connected to the input of the next stage to realize more complex function. Each CMOS stage consists of a network of P-type devices and a network of N-type devices connected together. The layout of each CMOS stage consists of a P-well region in which all the N-type devices are placed and an N-well region where all the P-type devices are placed. These devices are interconnected using the interconnection layers of the process technology to realize the circuit. To build a standard cell library, a convenient cell height is chosen and all the cells in the library are drawn with this same height or in some cases an integral multiple of the standard height. The width of each cell varies as needed to accommodate all of the devices and interconnect. The standard height of the library is divided into a top N-well portion where the P-type devices placed and a bottom P well portion where the N-type devices are placed. Typically, the P-well and N-well portions are equal. As mentioned earlier a standard cell could consist of a single stage or two stages and in some cases more than two CMOS stages. The widths of the N and P devices of a CMOS stage determines its drive strength, or its ability to drive a stable signal to the next cell that is connected to. These widths also determine the capacitive load that it presents to a cell that is driving it. The larger the device widths, the larger drive strength and also the larger its input capacitance. It is desirable to have a large drive strength but low input capacitance for any cell in the library. A standard cell library typically consists of multiple drive strength cells for any given logic function. A cell with two CMOS stages is typically built with the first stage using smaller devices so as to minimize the input pin capacitance and the second stage using larger devices in order to maximize its drive strength. This patent in some embodiments describes a novel layout scheme for such two stage cells where in the devices that make up the 2 CMOS stages are efficiently placed across 3 vertically stacked standard cell heights.

IC functions may be performed in sequential stages, where outputs of a first stage are used as input to a second stage. In some cases, stage functionality can be stacked vertically in rows of a standard cell to maximize use of circuit area (e.g., a split stack triple height cell as described further herein). Systems and methods are provided herein that include staged circuits (e.g., having two or more stages) implemented to fit within three or more rows (e.g., split stack triple height cell). The circuits can be those implemented with planar transistor technology, FinFet process technologies, and the like. More specifically, components of individual stages of a multi-stage circuit can be split across at least three rows of a device layout. The dividing of multi-stage IC circuitry across rows within cells and across separate cells may be strategically performed to realize design goals. For example, some embodiments may divide sub-circuitry or across different cells according to characteristics of the sub-circuitry such as physical sizes of components within the sub-circuitry.

Figure 1B:
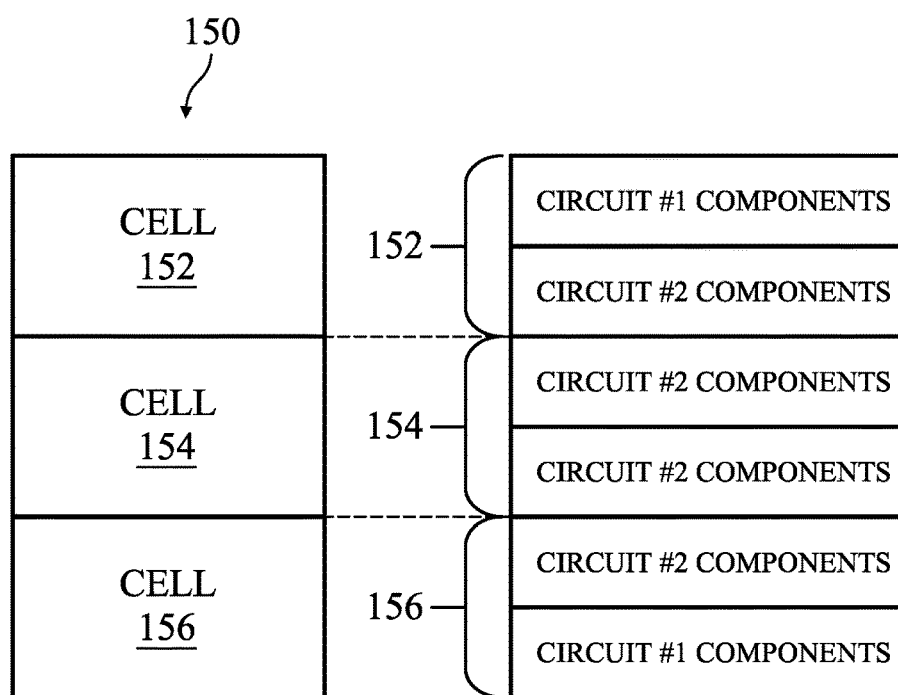
FIG. 1B illustrates a layout arrangement of split stack triple height cell in accordance with various embodiments of the present disclosure.

FIG. 1A illustrates a block diagram of an exemplary electronic device 100 implemented with staged circuits in accordance with various embodiments of the present disclosure. Electronic device 100 is implemented in at least two stages (e.g., a first stage and a second stage). In this example, the depiction of circuit 110 of the first stage, and the physical components of its implementation, are smaller than circuit 120 of the second stage because the first stage is designed to receive and generate drive strength less than the second stage which handles greater drive strength. FIG. 1B illustrates a block diagram of split stack triple height cell 150 in accordance with various embodiments of the present disclosure. Electronic device 100 of FIG. 1A is implemented within what is referred to herein as a split stack triple height cell 150, where components of individual stages of a multi-stage design are split among multiple rows of an at least three row tall structure. Split stack triple height cell 150 includes at least three rows 152, 154, 156 stacked on top of each other (e.g., triple height). The components of circuits 110, 120 are implemented across the stacked rows 152, 154, 156. More specifically, the components of circuit 110 can be split across rows 152, 156. The components of the larger circuit 120 can be split across multiple cells stacked within the structure 150. For example, circuit 120 can be implemented within as row 154 as well as a portion of row 152 and row 156. The components of smaller circuit 110 are split across a top portion of row 152 and a bottom portion of row 156.

Figure 2:
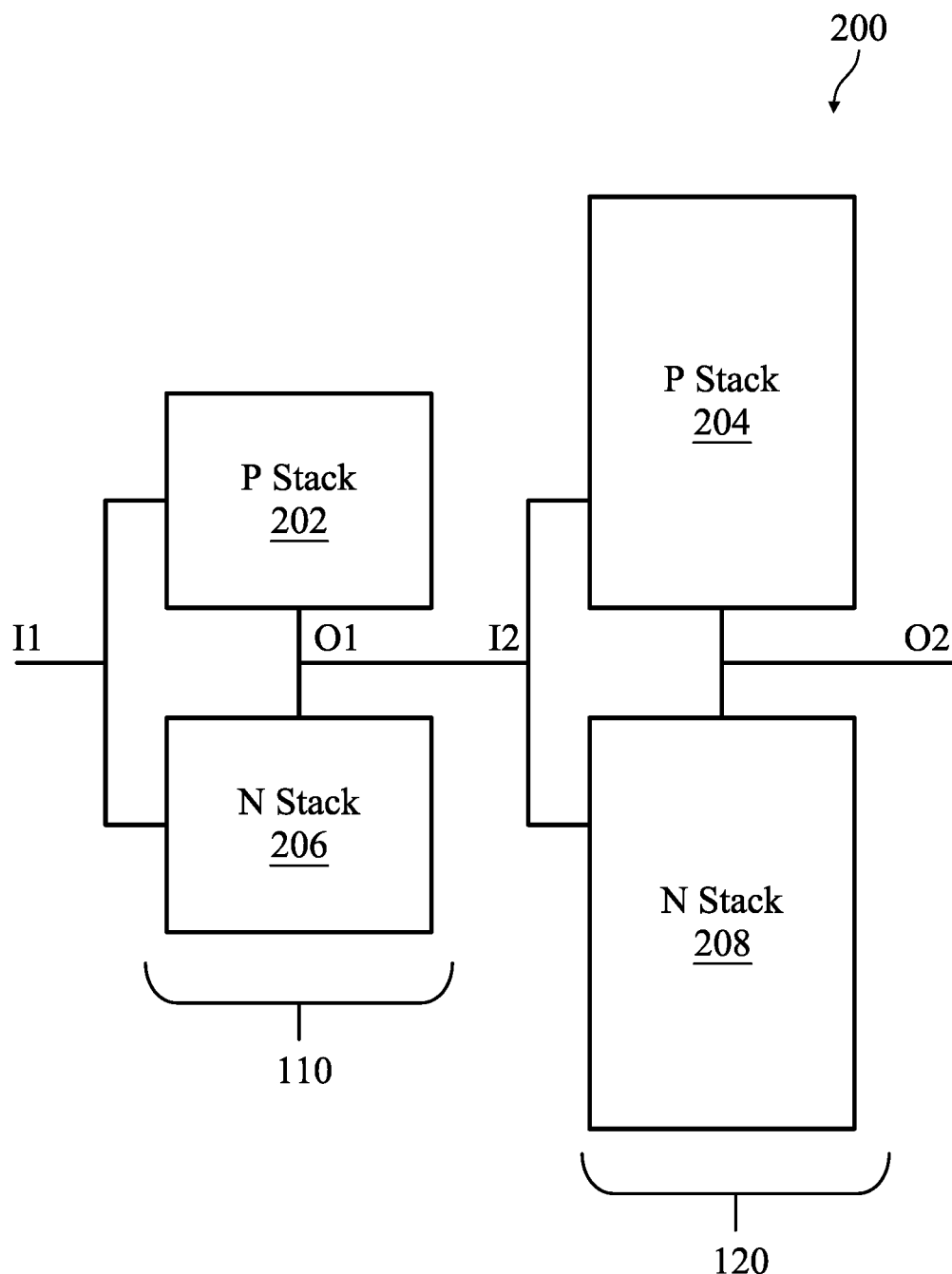
FIG. 2 illustrates a two stage CMOS diagram in accordance with various embodiments of the present disclosure.

FIG. 2 illustrates a two stage CMOS function where in the output of the first stage 110 is connected to the input of the second stage 120 in accordance with various embodiments of the present disclosure. Each of the stages 110 and 120 includes a network of P devices (e.g., P stacks 202, 204) and a network of N devices (e.g., N stacks 206, 208). The P stack 202 and N stack 206 of the first stage 110 are sized smaller compared to the size of the P stack 204 and N stack 208 of the second stage 120 in order to minimize input pin capacitance and maximize drive strength. This relative sizing is represented in FIG. 2 by smaller boxes for the first stage 110 and larger boxes for the second stage 120. FIG. 1B illustrates a generic split stack triple height cell layout arrangement for the 2 stage generic schematic in FIG. 1A in accordance with various embodiments of the present disclosure.

Figure 4:
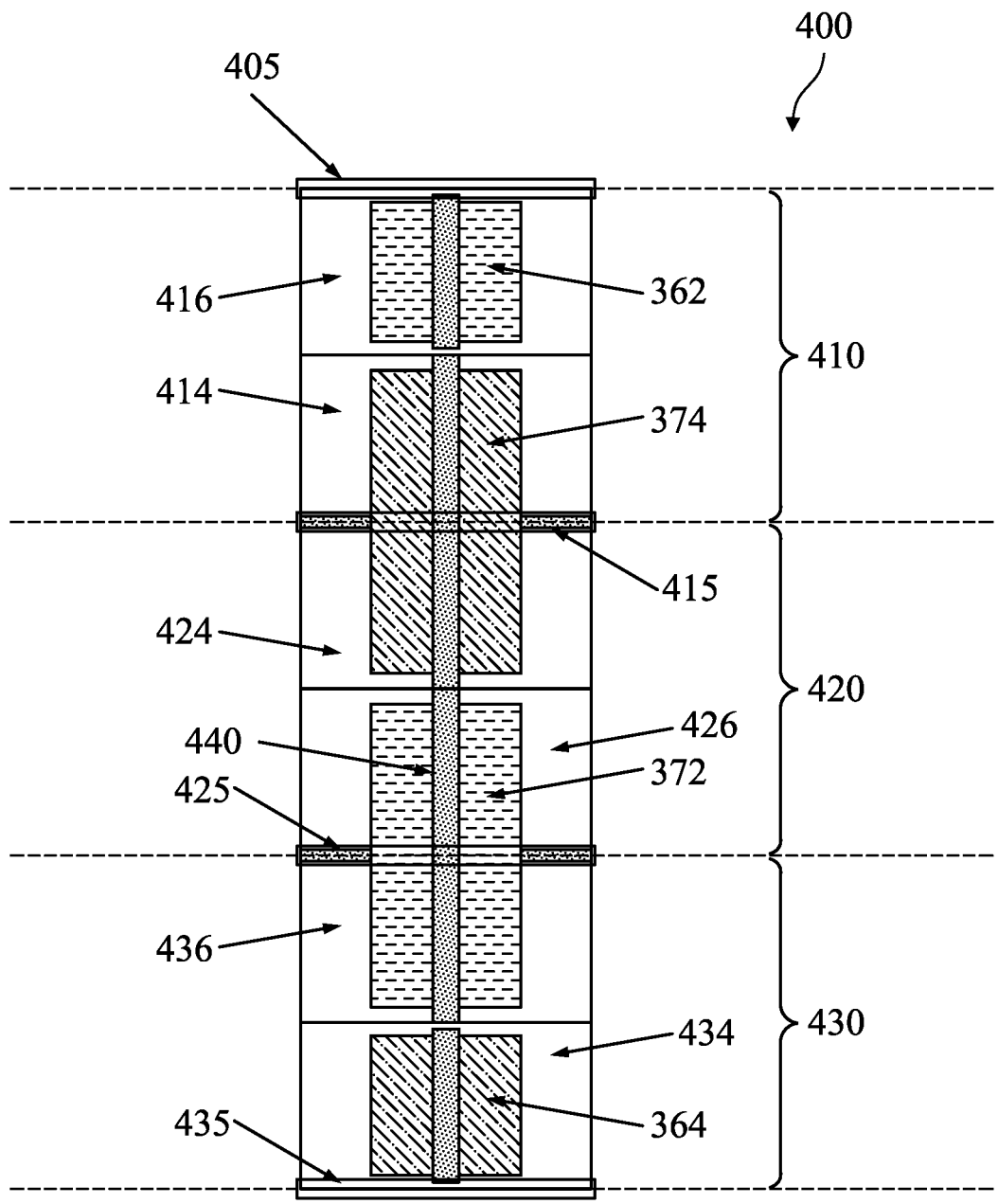
FIG. 4 illustrates an example device layout of the buffer in FIG. 3B implemented using planar transistors within a split stack triple height cell in accordance with various embodiments of the present disclosure.

Turning back to FIG. 1B, each row 152, 154, 156 is made up of a P and N well region as described in more detail in FIG. 4. The middle row (e.g., cell 154) is flipped with respect to the top row (e.g., cell 152) and bottom row (e.g., cell 156) such that the P-well region of the cell 152 abuts with the P-well region of the middle row (e.g., cell 154). The N-well region of the third row (e.g., cell 156) abuts with the N-well region of the middle row (e.g., cell 154). This results in a pattern of smaller N-well region followed by larger P-well region followed by larger N-Well region followed by a smaller P-well region from top to bottom. Accordingly, the topmost N-well region of cell 152 and the bottommost P-well region of cell 154 accommodate smaller width P device and N device respectively and the middle P-well region and N-well regions (e.g., cells 152, 154, 156) will accommodate a larger width N device and P device respectively. FIG. 1B also illustrates the placement of the various N and P devices in the CMOS schematic of FIG. 2 in this triple stack arrangement. The P stack 202 of the first stage 110 are placed in the topmost smaller N-well region and the N stack 206 of the first stage 110 are placed in the bottommost smaller P-well region. The N stack 208 of the second stage 120 are placed in the larger merged P-well region formed between the first and second rows (e.g., cells 152, 154) and the P stack 204 of the second stage 120 are placed in the larger merged N-well region formed between the second and third rows (e.g., cells 154, 156).

Figure 3A:
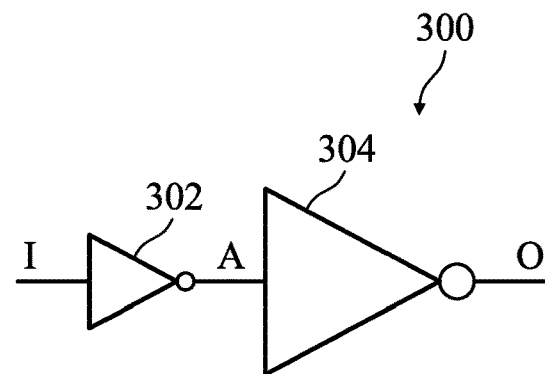
FIG. 3A illustrates an exemplary two-stage logic diagram of a buffer that can be implemented in a split stack triple height cell in accordance with various embodiments of the present disclosure.

FIG. 3A illustrates an exemplary two-stage logic diagram 300 that can be implemented in a split stack triple height cell in accordance with various embodiments of the present disclosure. The two-stage logic diagram 300 depicted in FIG. 3A is a buffer having a first inverter 302 and a second inverter 304. A buffer is an electronic circuit that outputs the same logic value as the input (e.g., if a logic low '0' is provided as input to a buffer, it will output a logic low '0'). Although the buffer outputs the same logic value that it receives as input, in the depicted example, the drive strength of the signal input to the buffer is amplified by the buffer. In other words, the output signal from the depicted buffer is of a greater drive strength than the input signal. The greater drive strength is used to drive a large circuit using the logic state of the original input signal.

The two-stage logic diagram 300 receives an input signal, I. The first inverter 302 outputs an inverted signal, A, to the second inverter 304. The second inverter 304 is electrically coupled in series with the first inverter 302. The second inverter 304 generates an output signal, O, that is substantially equivalent to the input signal, I, of the first inverter 302. The first inverter 302 is visually illustrated as a smaller device than the second inverter 304. The first inverter 302 is sized to be smaller than the second inverter 304 as it is designed to handle lower drive strength, and therefore requires smaller components. The second inverter 304 is visually illustrated as a larger device. The drive strength associated with the output signal, O, is larger than that of the input signal, I.

Figure 3B:
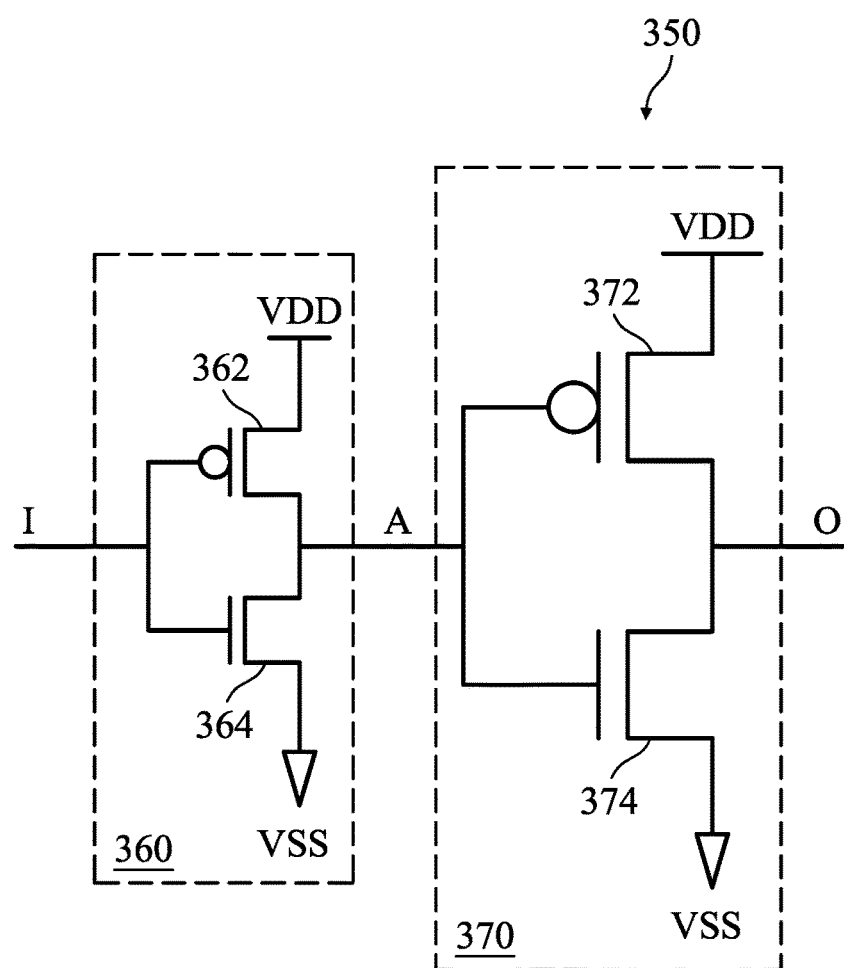
FIG. 3B illustrates an exemplary two-stage transistor level schematic of the two-stage buffer of FIG. 3A in accordance with various embodiments of the present disclosure.

FIG. 3B illustrates an exemplary two-stage transistor level electrical schematic 350 of the two-stage logic diagram 300 of FIG. 3A in accordance with various embodiments of the present disclosure. The two-stage transistor level electrical schematic 350 includes two complementary metal-oxide-semiconductor field-effect transistor (CMOS) inverters 360, 370 coupled together in series. CMOS inverter 360 is made up of a positive metal-oxide-semiconductor (PMOS) transistor 362 and a negative metal-oxide-semiconductor (NMOS) transistor 364. CMOS inverter 370 is made up of a PMOS transistor 372 and a NMOS transistor 374. CMOS inverter 370 can generate greater drive strength than the CMOS inverter 360 due to the physical sizing of each transistor. The CMOS inverters 360, 370 can be implemented in a split stack triple height cell as illustrated in FIG. 4.

FIG. 4 illustrates an example device layout of the buffer in FIG. 3B implemented using planar transistors within a split stack triple height cell 400 in accordance with various embodiments of the present disclosure. For illustration purposes, the PMOS transistors 362, 372 and NMOS transistors 364, 374 are illustrated as planar transistors. Split stack triple height cell 400 includes three stacked rows 410, 420, 430. A power rail and a ground rail are at the row boundaries bounding each cell. For example, row 410 is bounded by power rail 405 (e.g., VDD) and ground rail 415 (e.g., VSS). Row 420 is bounded by ground rail 415 (e.g., VSS) and power rail 425 (e.g., VDD). Row 430 is bounded by power rail 425 (e.g., VDD) and ground rail 435 (e.g., VSS). The power and ground rails provide power to the components implemented within the rows.

Each row has a P-well and an N-well. For example, first row 410 includes P-well 414 and N-well 416. Second row 420 includes P-well 424 and N-well 426. Third row 430 includes P-well 434 and N-well 436. P-well 414 and P-well 424 abut each other and create a larger P-well area (e.g., approximately double in size) than the area covered by P-well 434. Similarly, N-well 426 and N-well 436 abut each other and create a larger N-well area (e.g., approximately double in size) than the area covered by N-well 416. The merged P-well region (e.g., P-well 414 and P-well 424) and the merged N-well region (e.g., N-well 426 and N-well 436) each facilitate diffusion across the area between rows 410, 420, 430. Use of the area between the rows 410, 420, 430 facilitates use of more area of the triple stack cell height structure 400. In other words, less area of the triple stack cell height structure goes unused. The CMOS inverters 360, 370 are implemented within the rows 410, 420, 430. More specifically, PMOS transistors are implemented within N-wells and NMOS transistors are implemented in P-wells. Because CMOS inverter 370 is larger in size than CMOS inverter 360, the components of CMOS inverter 370 are implemented across the larger P-well and N-well areas. In other words, NMOS transistor 374 is implemented within the larger P-well area formed by P-well 414 and P-well 424. PMOS transistor 372 is implemented within the larger N-well area formed by N-well 426 and N-well 436. A polysilicon interconnect 440 connects the PMOS transistor 372 with NMOS transistor 374 to form the CMOS inverter 370. Because CMOS inverter 360 is smaller in size than CMOS inverter 370, CMOS inverter 360 can be split across row 410 and row 430. PMOS transistor 362 is implemented in N-well 416. NMOS transistor 364 is implemented in P-well 434.

Figure 5:
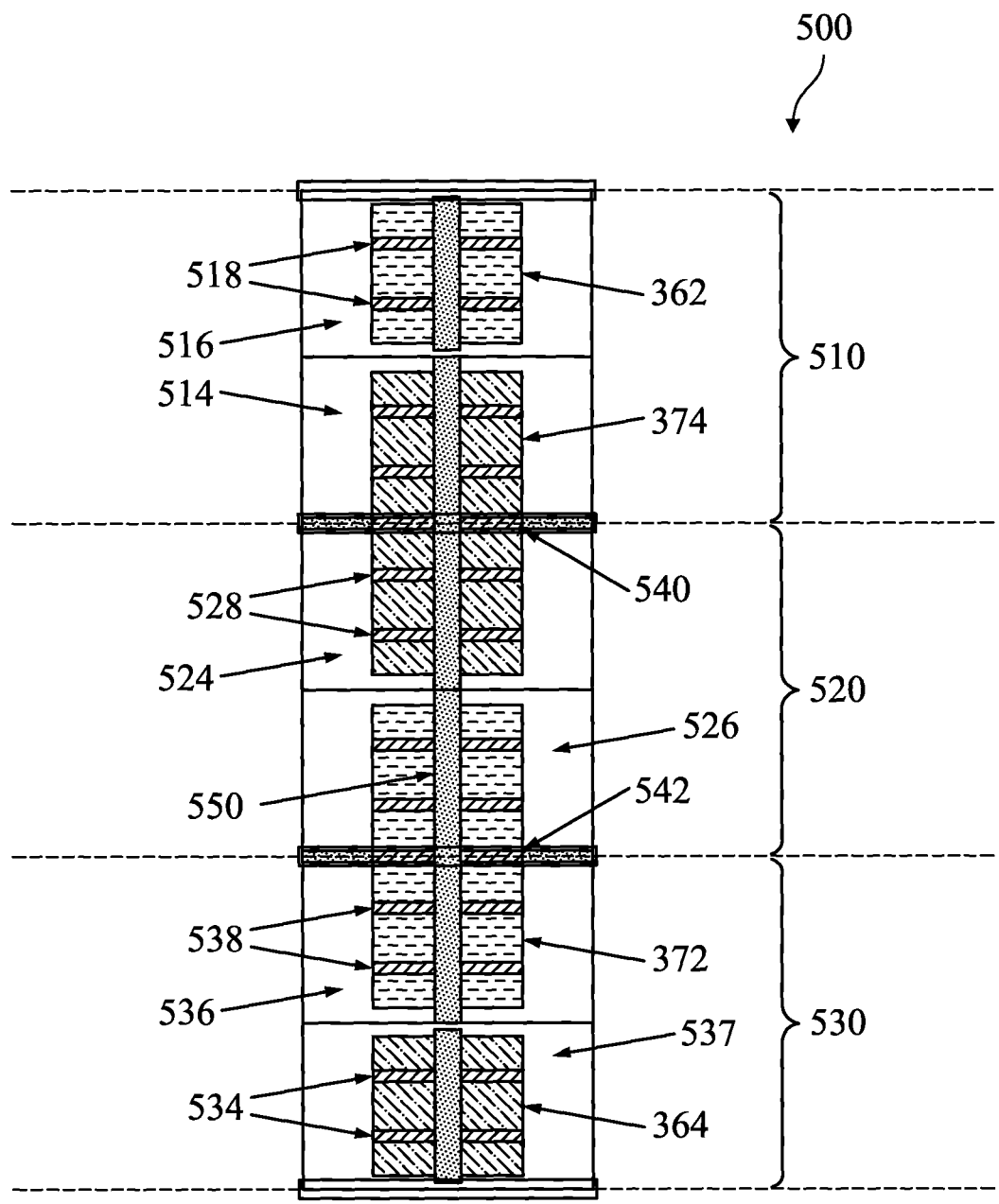
FIG. 5 illustrates another example device layout of the buffer in FIG. 3B implemented using FINFETs within a split stack triple height cell in accordance with various embodiments of the present disclosure.

FIG. 5 illustrates another example layout of the buffer in FIG. 3B implemented using FINFETs within a split stack triple height cell 500 in accordance with various embodiments of the present disclosure. For illustration purposes, the PMOS transistors 362, 372 and NMOS transistors 364, 374 are illustrated as FinFet transistors. Split stack triple height cell 500 includes rows 510, 520, 530. In the embodiment illustrated in FIG. 5, CMOS inverter 370 is implemented in rows 510, 520, 530. More specifically, PMOS transistor 372 having five P-fins 538 including P-fin 542 is implemented in the larger N-well area formed by the combination of N-well 526 of row 520 and N-well 536 of row 530. P-fin 542 in some embodiments may be a dummy fin. In other embodiments, P-fin 542 may be an active fin. NMOS transistor 374 having five N-fins 528 is implemented in the larger P-well area formed by P-well 514 of row 510 and P-well 524 of row 520. N-fin 540 in some embodiments may be a dummy fin. In other embodiments, N-fin 540 may be an active fin. Polysilicon 550 forms the gate for the NMOS transistor 374 and PMOS transistor 372 to form the CMOS inverter 370. The polysilicon 550 also connects the gates of NMOS transistor 374 and PMOS transistor 372 together as illustrated in FIG. 3B.

CMOS inverter 360 is split across a top portion of row 510 and a bottom portion of row 530. More specifically, PMOS transistor 362 having two P-fins 518 is implemented within N-well 516 of row 510 (e.g., top portion of row 510). NMOS inverter 364 having two N-fins 534 is implemented within P-well 537 of row 550 (e.g., bottom portion of row 530). The layout is completed along with the power rails and other connections between the devices in accordance with the circuit schematic of FIG. 3B using the interconnect layers.

FIG. 6A illustrates another exemplary two-stage transistor level schematic of an AND gate 600 that can be implemented in a split stack triple height cell in accordance with various embodiments of the present disclosure. An AND gate is a logic gate that outputs a logic high when both inputs to the AND gate are logic high and a logic low when either of the inputs is at a logical low level. The AND gate 600 includes two stages: a NAND gate 610 and inverter 620. The NAND gate 610 includes PMOS transistors 612, 614 and NMOS transistors 616, 618. A NAND gate is a logic gate that outputs a logic low when both inputs are high and a logic high when either of the inputs are at logic low level. Inverter 620 includes PMOS transistor 622 and NMOS transistor 624. Inverter 620 is constructed using larger devices than that of NAND gate 610.

FIG. 6B illustrates an example layout of the AND gate 600 of FIG. 6A implemented within a split stack triple height cell 650 in accordance with various embodiments of the present disclosure. Split stack triple height cell 650 includes three stacked rows 660, 670, 680. For illustration purposes, the PMOS transistors 612, 614, 622 and NMOS transistors 616, 618, 624 are illustrated as FinFet transistors. Row 660 includes P-well 662 and N-well 663. Row 670 includes P-well 672 and N-well 673. Row 680 includes P-well 682 and N-well 683. Because NAND gate 610 uses transistors with lesser fins than that of inverter 620, NAND gate 610 can be split across a top portion of row 660 and a bottom portion of row 680. More specifically, PMOS transistor 612 having two P-fins 664 and PMOS transistor 614 having two P-fins 665 are both implemented in N-well 663. NMOS transistor 616 having N-fins 684 and NMOS transistor 618 having N-fins 686 are both implemented in P-well 682. Because inverter 620 uses larger number of fins than NAND gate 610, PMOS transistor 622 and NMOS transistor 624 are implemented within larger N-well and P-well areas. More specifically, NMOS transistor 624 having fins 674 is implemented across two legs or columns 692, 694 within the larger P-well created by abutting P-well 662 and P-well 672. N-fin 676 in some embodiments may be a dummy fin. In other embodiments, N-fin 676 may be an active fin. PMOS transistor 622 having P-fins 687 is implemented across two legs or columns 692, 694 within the larger N-well area created by abutting N-well 673 and N-well 683. P-fin 688 in some embodiments may be a dummy fin. In other embodiments, P-fin 688 may be an active fin.

The merged P-well region (e.g., P-well 662 and P-well 672) and the merged N-well region (e.g., N-well 673 and N-well 683) each facilitate active diffusion along the intersection area between rows 660, 670, 680. Use of the intersection area between the rows 660, 670, 680 for active diffusion results in increased diffusion width per leg in the triple height structure. This in turn results in increased drive strength of the cell for the same cell area. Use of more area within the triple stack cell height structure 600 also enables a lesser number of legs within the structure to achieve a given drive strength. With a lesser number of legs, the wiring needed to connect different legs is reduced, in turn reducing the interconnect parasitics. With lesser parasitics, the performance and power of the cell improves. This also results in lesser routing blockage within the cell, improving signal routability. The pins are also distributed over three rows 660, 670, 680 further increases pin accessibility for routing.

Figure 7:
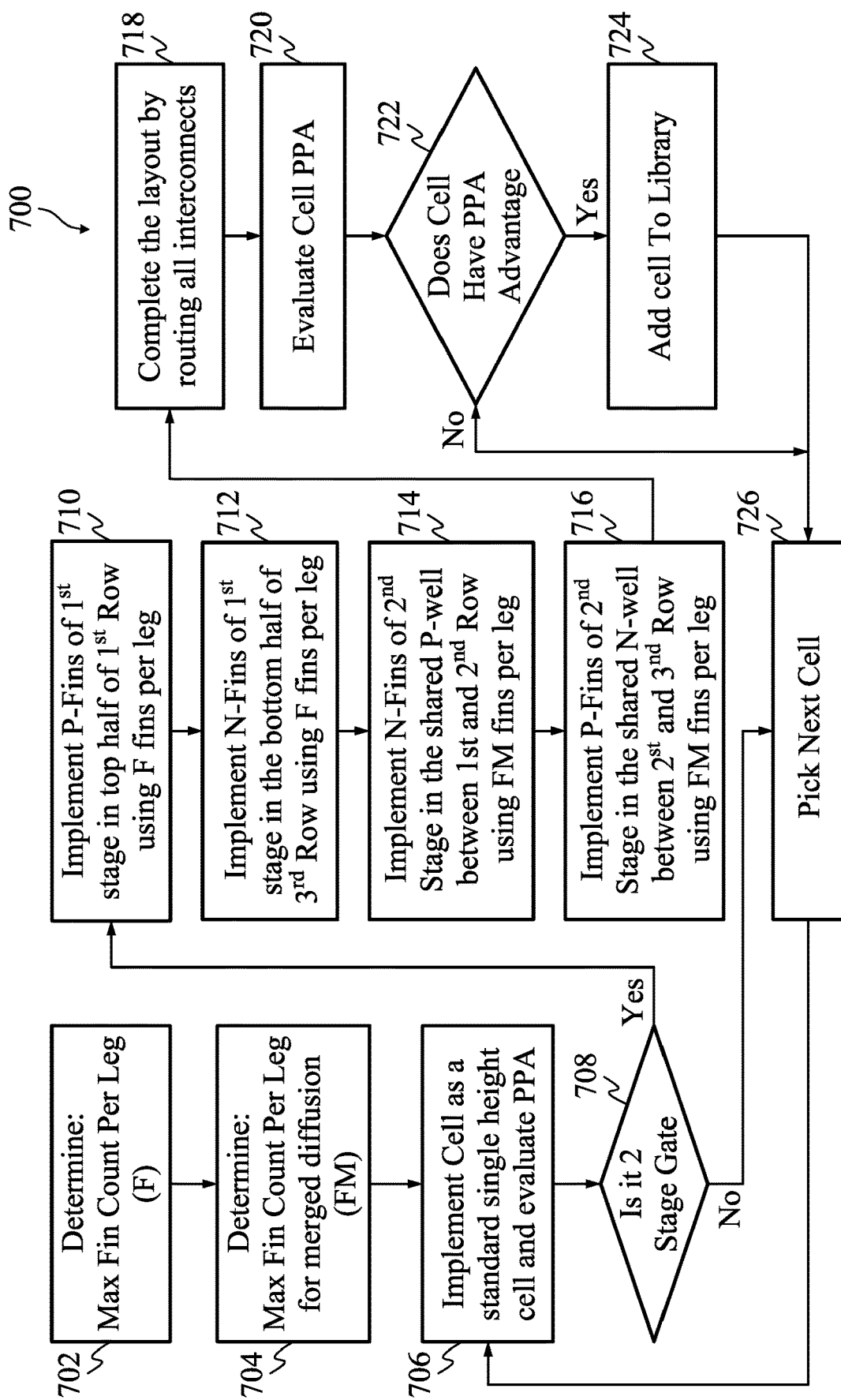
FIG. 7 is an exemplary flow chart illustrating a method for generating a standard cell library having split stack triple height cells in accordance with various embodiments of the present disclosure.

FIG. 7 is an exemplary flow chart 700 illustrating a method to determine if each cell in the standard cell library is a good candidate for implementing as a split stack triple height cells in accordance with various embodiments of the present disclosure. While FIG. 7 is described here with reference to previously described structures for ease in understanding, it is understood that the method applies to many other structures as well. In order to generate a split stack cell height structure, such as those illustrated in FIGS. 3B, 4, and 6B, a maximum number of P or N Fins that can be implemented per leg within a single standard cell height is determined (e.g., step 702). For example, considering row 660 the maximum number of P fins or N fins that can be implemented in one leg or column, 692 within this row is two (e.g., two P-fins 664 and two N-fins 674). Similarly the maximum number of fins for row 660 within the leg or column 694 is also two (e.g., two P-fins 665 and two N-fins 674). A maximum fin count per leg for merged diffusion is then determined (e.g., step 704). This fin count will include the two fins per leg within each row and an additional fin at the intersection of the rows. This fin count accounts for the fins between similar wells of abutting rows. For example, P-well 662 of row 660 abuts P-well 672 of row 670 each of which can accommodate two fins. In addition, a fin 676 can be placed at the intersection of the rows 660, 670. In this example, the maximum fin count for leg or column 694 is five. The cell is first implemented as a standard single height cell and its PPA is evaluated (e.g. step 706). Next it is determined if the cell is a stage CMOS gate (e.g., step 708). If the cell is a single stage CMOS gate, the cell is not considered for split stack triple height implementation and analysis is shifted to the next cell in the standard cell library (e.g. step 726) and the process is repeated starting back at step 706. If the cell consists of two CMOS stages, then P-fins of the first stage (e.g., P-fins 518 of PMOS transistor 362 or P-fins 664 of PMOS transistor 612 and P-fins 665 of PMOS transistor 614) are implemented within a top portion of the first row (e.g., N-well 516 of row 510 or N-well 663 of row 660) of the triple stacked cell height structure (e.g., step 710). The PMOS device may need to be implemented with multiple legs if the number of P fins needed exceed the maximum number of fins per leg within one row. Next, N-fins of the first stage device (e.g., N-fins 534 of NMOS transistor 364 or N-fins 684 of NMOS transistor 616 and N-fins 686 of NMOS transistor 618) are implemented in the bottom half of the third row (e.g., P-well 537 of row 530 or P-well 682 of row 680) (e.g., step 712). The N-fins of the second stage device (e.g., N-fins 528 of NMOS transistor 374 or N-fins 674 of NMOS transistor 624) are implemented within the larger P-well area of abutting P-wells (e.g., P-well 514 and P-well 524 or P-well 662 and P-well 672) between the first and second rows (e.g., row 510 and row 520 or row 660 and row 670) based on the maximum number of fins per leg for the merged diffusion (e.g., step 714). Using the example triple stack cell height structure 650, the number of N-fins 674 implemented per leg (e.g., leg 692 or leg 694) is five (e.g., two N-fins in P-well 662, two N-fins in P-well 672 and one N-fin 676 between P-well 662 and P-well 672). The P-fins of the second stage device (e.g., P-fins 538 of PMOS transistor 372 or P-fins 687 of PMOS transistor 622) are implemented within the larger N-well area of abutting N-wells (e.g., N-well 526 and N-well 536 or N-well 673 and N-well 683) between the second and third rows (e.g., row 520 and row 530 or row 670 and row 680) based on the maximum number of fins per leg for the merged diffusion (e.g., step 716). Once the various transistors and fins are placed within the layout, the layout is completed by establishing all the interconnects as per the circuit schematic (e.g., step 718). PPA analysis is performed through simulation using the generated device layout (e.g., step 720). It is then determined whether the PPA analysis is better than that output during step 706 (e.g., step 722). If the PPA analysis is better than that output during step 706, then the cell is added to a cell library such as those described by FIGS. 8-9 (e.g., step 724) and the next cell is selected analysis (e.g., step 726). If the PPA analysis, on the other hand, is not better than that output during step 706, then the cell is not added to the library and the next cell is selected from the cell library (e.g., step 726).

Figure 8:
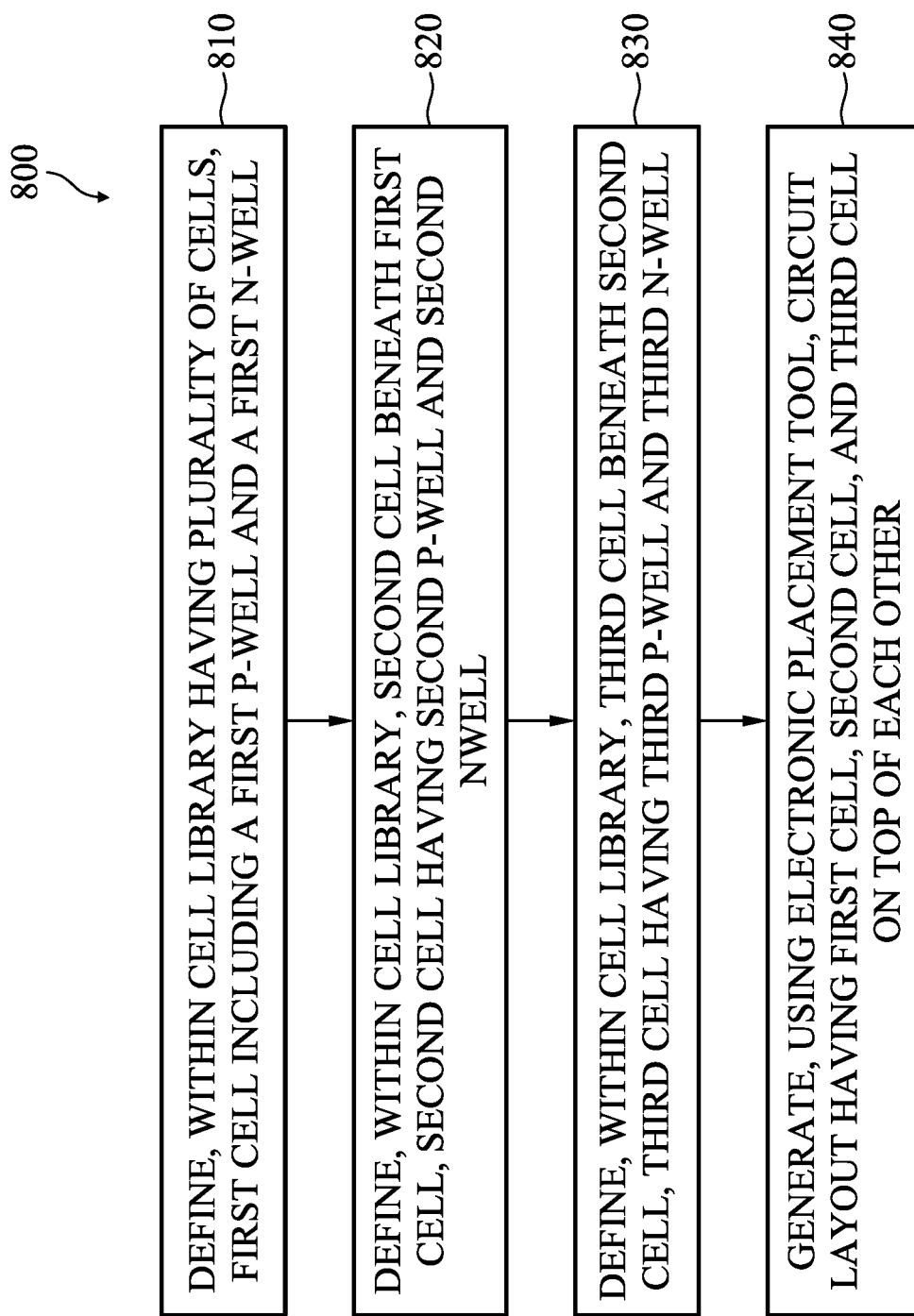
FIG. 8 is an exemplary flow chart illustrating a computer-implemented method of generating a device layout of a split stack triple height cell in accordance with various embodiments of the present disclosure.

FIG. 8 is an exemplary flow chart 800 illustrating a computer-implemented method of generating a device layout of a split stack triple height cell in accordance with various embodiments of the present disclosure. While FIG. 8 is described here with reference to previously described structures for ease in understanding, it is understood that the method applies to many other structures as well. A computer-implemented method of defining a circuit layout (e.g., split stack triple height cell 400, split stack triple height cell 500, split stack triple height cell 650) including a plurality of stacked rows (e.g., rows 410, 420, 430; rows 510, 520, 530; rows 660, 670, 680) includes a number of steps. A cell library such as cell repository 910 includes split stack triple height cell (e.g., split stack triple height cell 400, split stack triple height cell 500, split stack triple height cell 650). A first row (e.g., row 410; row 510; row 660) including a first P-well (e.g., 414; 514; 662) and a first N-well (e.g., 416; 516; 663) is defined within the cell library such as cell repository 910 (e.g., at step 810). A P-device (e.g., PMOS transistor 362; PMOS transistor 612 or PMOS transistor 614) of a first electrical component (e.g., CMOS inverter 360; NAND gate 610) is formed in the first N-well (e.g., N-well 416; N-well 516; N-well 663). A second row (e.g., row 420; row 520; row 670) is defined within the cell library (e.g., cell repository 910) beneath the first row such as row 410, row 510, or row 660 (e.g., step 820). The second row (e.g., row 420; row 520; row 670) includes a second P-well (e.g., P-well 424; P-well 524; P-well 672) and a second N-well (e.g., N-well 426; N-well 526; N-well 673). An N-device (e.g., NMOS transistor 374; NMOS transistor 624) of a second electrical component (e.g., CMOS inverter 370; inverter 620) is formed within the first P-well (e.g., P-well 414; P-well 514; P-well 662) and the second P-well (e.g., P-well 424; P-well 524; P-well 672). A third row (e.g., row 430; row 530; row 680) beneath the second row (e.g., row 420; row 520; row 670) is defined within the cell library such as cell repository 910 (e.g., step 830). The third row (e.g., row 430; row 530; row 680) includes a third P-well (e.g., P-well 434; P-well 537; P-well 682) and a third N-well (e.g., N-well 436; N-well 536; N-well 683). A P-device (e.g., PMOS transistor 372; PMOS transistor 622) of the second electrical component (e.g., CMOS inverter 370; inverter 620) is formed within the second N-well (e.g., N-well 426; N-well 526; N-well 673) and the third N-well (e.g., N-well 436; N-well 536; N-well 683) and an N-device (e.g., NMOS transistor 364; NMOS transistor 616 or NMOS transistor 618) of the first electrical component (e.g., CMOS inverter 360; NAND gate 610) is formed within the third P-well (e.g., P-well 434; P-well 537; P-well 682). The circuit layout such as split stack triple height cell 400, split stack triple height cell 500, or split stack triple height cell 650, includes the first row (e.g., row 410; row 510; row 660), the second row (e.g., row 420; row 520; row 670), and the third row (e.g., row 430; row 530; row 680) stacked on top of each other.

Figure 9:
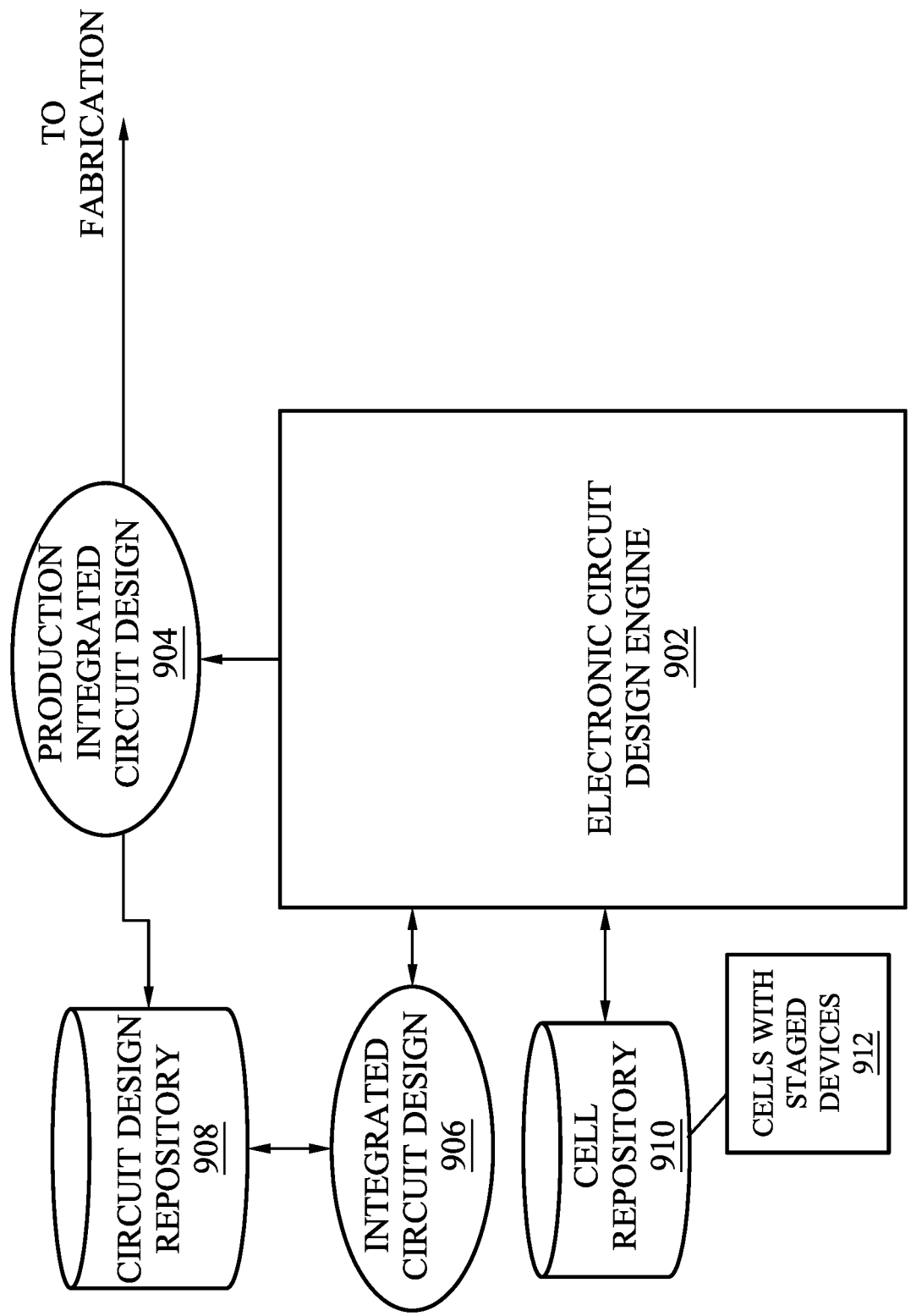
FIG. 9 is a block diagram depicting an electronic circuit design engine in accordance with various embodiments of the present disclosure.

FIG. 9 is a block diagram depicting an electronic circuit design engine in accordance with various embodiments of the present disclosure. The electronic circuit design engine 902 facilitates development of a production integrated circuit design 904 that is used in the fabrication of a physical integrated circuit. The electronic circuit design engine 902 receives or facilitates initial generation of an integrated circuit design 906 that may be developed (e.g., over a number of iterative revisions) and stored in a non-transitory circuit design repository 908, such as via interactions with a user interface or execution of automated scripts. For example, on request, the electronic circuit design engine 902 may access or receive the integrated circuit design 906 in the form of a computer file, perform operations on the integrated circuit design 906, and then output a modified form of the design (e.g., as an integrated circuit design 906 file for storage in the design repository 908 or as a production integrated circuit design 904 (e.g., in the form of an EDA file, a netlist) for fabrication). The integrated circuit design 906 may be made up of a plurality of components (e.g., resistors, capacitors, transistors logic gates, data signal lines), some or all of which take the form of cells. The integrated circuit design 906 may take are variety of forms, such as a behavioral model of a design in a register-transfer level (RTL) representation or a more hardware specific specification, such as a netlist. The electronic circuit design engine 902 is responsive to one or more cell repositories (e.g., cell repository 910) that store data associated with cells that can be used as building blocks in the generation of integrated circuit designs 904, 906. Such cells can include standard cells that may take a variety of forms and represent a variety of functions (e.g., the operation of one or more logic gates), such as split triple stack cell height structures implementing two or more stages of a logic gate.

Figure 10:
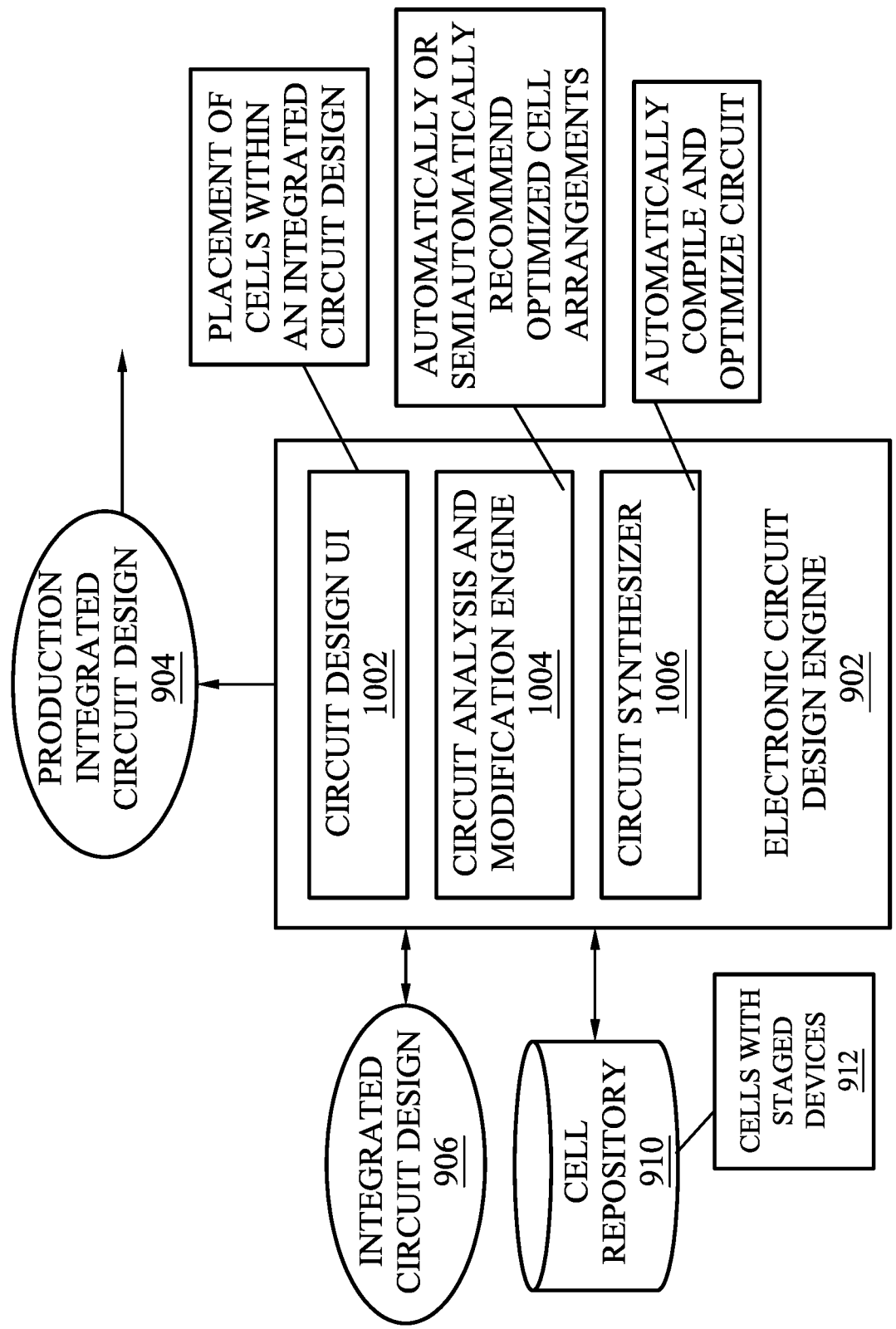
FIG. 10 is a block diagram depicting modules of a circuit design engine in accordance with various embodiments of the present disclosure.

Electronic circuit design engines may provide a variety of different circuit design functionality. FIG. 10 is a block diagram depicting modules of a circuit design engine in accordance with various embodiments of the present disclosure. An electronic circuit design engine 902 receives an integrated circuit design 906 via a file or commands that dictate the content of that design 906 entered via a mechanism such as a circuit design user interface 1002. The interface 1002 may display graphics or text describing an integrated circuit design and provide commands for building and manipulating the design. The circuit design user interface 1002 can be used, for example, place the cells within an integrated circuit design. For example, the circuit analysis and modification engine 1004 can automatically or semi automatically recommend optimized cell arrangements such as those described in FIGS. 1A-6B. The electronic circuit design engine 902 is further responsive to a cell repository 910 that stores cell data records like the one depicted at 912 with varying heights which may not a multiple of a standard single cell row height and with the placement reference edge at the intersection of the N-well and P-well. The circuit design user interface 1002 can provide controls for accessing standard cells from the repository 910 and integrating them into an integrated circuit design 906. Upon completion of an integrated circuit design 906, the design may be output from the electronic circuit design engine 902 for saving in a non-transitory computer readable medium or as a production integrated circuit design 904 for fabrication of an integrated circuit. Additionally, a circuit synthesizer 1006 can automatically compile and optimize the integrated circuit design 906.

Figure 11:
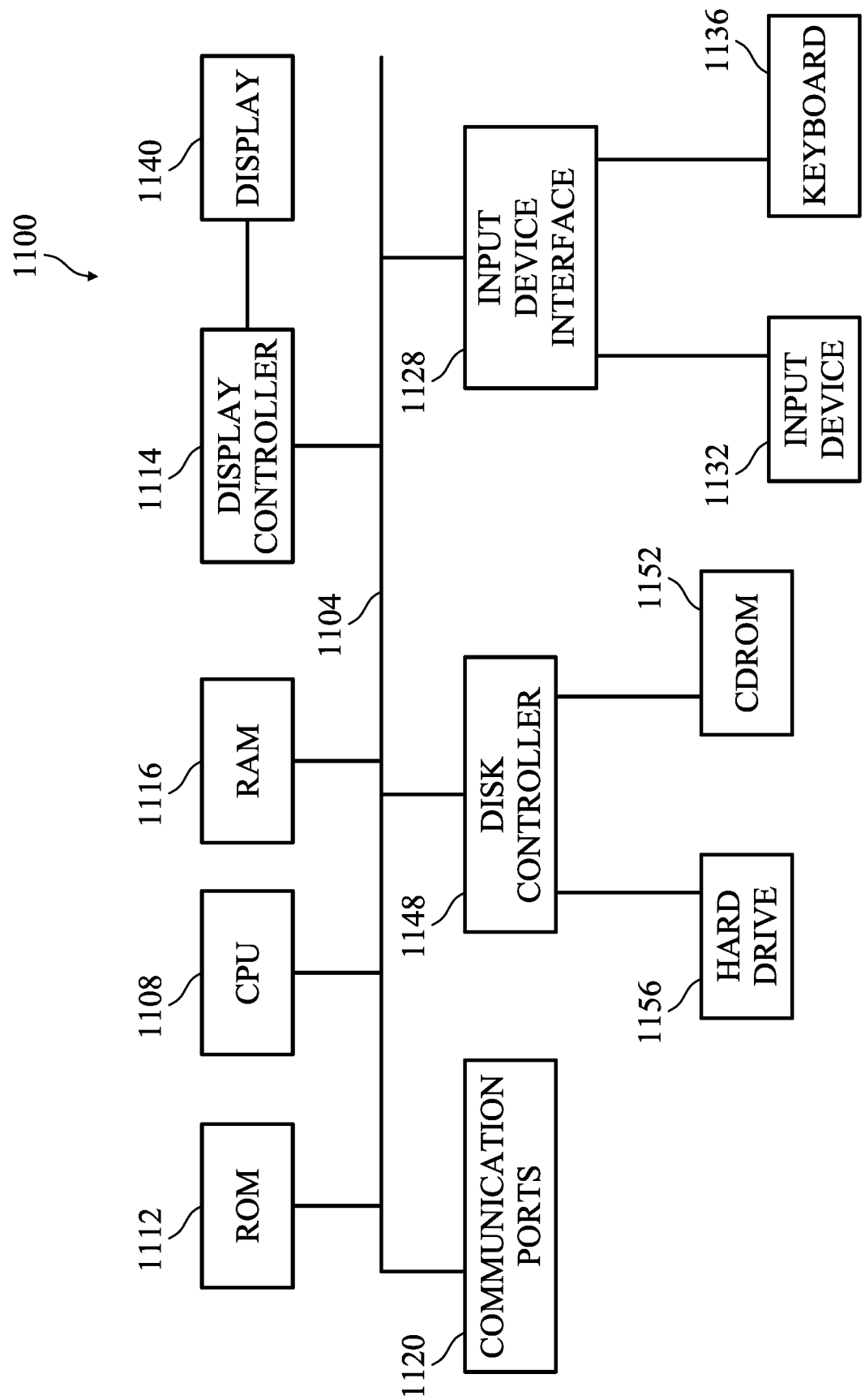
FIG. 11 is an exemplary block diagram illustrating a sample computing device architecture for implementing various aspects described herein in accordance with various embodiments of the present disclosure.

FIG. 11 is an exemplary block diagram 1100 illustrating a sample computing device architecture for implementing various aspects described herein. A bus 1104 can serve as the information highway interconnecting the other illustrated components of the hardware. A processing system 1108 labeled CPU (central processing unit) (e.g., one or more computer processors/data processors at a given computer or at multiple computers), can perform calculations and logic operations required to execute a program. A non-transitory processor-readable storage medium, such as read only memory (ROM) 1112 and random access memory (RAM) 1116, can be in communication with the processing system 1108 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 1148 can interface one or more optional disk drives to the system bus 1104. These disk drives can be external or internal CD-ROM, CD-R, CD-RW or DVD, or solid state drives such as 1152, or external or internal hard drives 1156. As indicated previously, these various disk drives 1152, 1156 and disk controllers are optional devices. The system bus 1104 can also include at least one communication port 1120 to allow for communication with external devices either physically connected to the computing system or available externally through a wired or wireless network. In some cases, the communication port 1120 includes or otherwise comprises a network interface.

To provide for interaction with a user, the subject matter described herein can be implemented on a computing device having a display device 1140 (e.g., a CRT (cathode ray tube) or LCD (liquid crystal display) monitor) for displaying information obtained from the bus 1104 to the user and an input device 1132 such as keyboard 1136 and/or a pointing device (e.g., a mouse or a trackball) and/or a touchscreen by which the user can provide input to the computer. Other kinds of input devices 1132 can be used to provide for interaction with a user as well; for example, feedback provided to the user can be any form of sensory feedback (e.g., visual feedback, auditory feedback by way of a microphone or tactile feedback); and input from the user can be received in any form, including acoustic, speech, or tactile input. In the input device 1132 and the keyboard 1136 can be coupled to and convey information via the bus 1104 by way of an input device interface 1128. Other computing devices, such as dedicated servers, can omit one or more of the display 1140 and display interface 1114, the input device 1132, the keyboard 1136, and input device interface 1128.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein and may be provided in any suitable language such as C, C++, JAVA, Perl, Python, Tcls, for example, or any other suitable programming language. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

Use of the various processes as described herein can provide a number of advantages. For example, use of the subject matter enables improved performance of stages electronic devices throughout improved power and signal routability. Additionally, splitting of the device transistors across multiple rows of a split stack triple height cell based on sizing of the staged components occupies a smaller surface area.

In one embodiment, a split stack triple height cell includes a circuit, a first row, a second row, and a third row. The circuit includes a first stage having a first plurality of electrical components and a second stage having a second plurality of electrical components. The first row includes a first electrical component of the first plurality of electrical components within a top portion of the first row. The second row is stacked beneath the first row. A first electrical component of the second plurality of electrical components is within a bottom portion of the first row and a top portion of the second row and across a boundary between the first row and the second row. The third row is stacked beneath the second row. A second electrical component of the second plurality of electrical components is within a top portion of the third row and a bottom portion of the second row and across a boundary between the second row and the third row and wherein a second electrical component of the first plurality of electrical components is within a bottom portion of the third row.

In another embodiment, a device includes a first logic gate and a second logic gate. The first logic gate is formed within a first section of a multiple row structure and a fourth section of the multiple row structure. The second logic gate is formed within a second section of the multiple row structure and a third section of the multiple row structure. The first section and a portion of the second section forms a first row. Another portion of the second section and half of the third section forms a second row. Another portion of the third section and the fourth section forms a third row. The first row, the second row, and the third row are stacked on top of each other form the multiple row structure.

In yet another embodiment, a computer-implemented method of defining a device layout including a split stack triple height cell having a plurality of stacked rows. A first row including a first P-well and a first N-well is defined within a cell library (e.g., step 810). A P-device of a first electrical component is formed in the first N-well. A second row beneath the first row is defined within the cell library (e.g., step 820). The second row includes a second P-well and a second N-well. The N-device of a second electrical component is formed within the first P-well and the second P-well. A third row beneath the second row is defined within the cell library (e.g., step 830). The third row includes a third P-well and a third N-well. The P-device of the second electrical component is formed within the second N-well and the third N-well and an N-device of the first electrical component is formed within the third P-well. Using an electronic placement tool the circuit layout is generated having the first row, the second row, and the third row stacked on top of each other (e.g., step 840).

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A structure comprising:
    a circuit comprising a first stage having a first plurality of electrical components and a second stage having a second plurality of electrical components;
    a first row comprising a first electrical component of the first plurality of electrical components within a top portion of the first row;
    a second row stacked beneath the first row, wherein a first electrical component of the second plurality of electrical components is within a bottom portion of the first row and a top portion of the second row and across a boundary between the first row and the second row;
    a third row stacked beneath the second row, wherein a second electrical component of the second plurality of electrical components is within a top portion of the third row and a bottom portion of the second row and across a boundary between the second row and the third row and wherein a second electrical component of the first plurality of electrical components is within a bottom portion of the third row; and
    a power rail or a ground rail at a top outer boundary of the first row, the boundary between the first row and the second row, the boundary between the second row and the third row, or a bottom outer boundary of the third row.

2. The structure of claim 1, wherein the first stage and the second stage are logic gates couple together, an output of the first stage is an input of the second stage, and the first stage is of a smaller physical size than the second stage.

3. The structure of claim 1, further comprising a polysilicon interconnect across the bottom portion of the first row, the top portion and the bottom portion of the second row, and a top portion of the third row, wherein the polysilicon interconnect couples together the second plurality of electrical components of the second stage.

4. The structure of claim 1, wherein each of the first stage and the second stage comprise at least one of an inverter, an AND gate, a NAND gate, or an OR gate.

5. The structure of claim 1, wherein the first plurality of electrical components or the second plurality of electrical components comprise planar transistors.

6. The structure of claim 1, further comprising:
    a first power rail and a first ground rail at the top outer boundary and a bottom outer boundary of the first row, respectively, wherein the first ground rail is at the boundary between the first row and the second row; and
    a second power rail and a second ground rail at a top outer boundary and the bottom outer boundary of the third row, respectively, wherein the second power rail is at the boundary between the second row and the third row.

7. The structure of claim 1, wherein the first plurality of electrical components or the second plurality of electrical components comprise FinFet transistors having a plurality of fins and wherein a number of fins of the first stage is less than a number of fins of the second stage.

8. The structure of claim 7, further comprising:
    a third electrical component of the first plurality of electrical components within the first row, wherein the first electrical component of the first plurality of electrical components is oriented in a first leg of the first row and the third electrical component of the first plurality of electrical components is oriented in a second leg of the first row; and
    a fourth electrical component of the first plurality of electrical components within the third row, wherein the second electrical component of the first plurality of electrical components is oriented in a first leg of the third row and the fourth electrical component of the first plurality of electrical components is oriented in a second leg of the third row.

9. The structure of claim 7, wherein the first electrical component of the second plurality of electrical components is split across a first leg and a second leg.

10. The structure of claim 9, wherein an active fin of each of the first leg and the second leg is on the boundary between the first row and the second row, aligning with the first ground rail.

11. The structure of claim 7, wherein the second electrical component of the second plurality of electrical components is split across a first leg and a second leg.

12. The structure of claim 11, wherein an active fin of each of the first leg and the second leg is on the boundary between the second row and the third row, aligning with the second power rail.

13. A device comprising:
    a first logic gate formed within a first section of a multiple row structure and a fourth section of the multiple row structure;
    a second logic gate formed within a second section of the multiple row structure and a third section of the multiple row structure,
    wherein:
        the first section and a portion of the second section form a first row, another portion of the second section and a portion of the third section form a second row, another portion of the third section and the fourth section form a third row, and the first row, the second row, and the third row stacked on top of each other form the multiple row structure; and a power rail or a ground rail at a top outer boundary of the first row, a boundary between the first row and the second row, a boundary between the second row and the third row, or a bottom outer boundary of the third row.

14. The device of claim 13, wherein the second section is larger than the size of the first section and the third section is double the size of the fourth section.

15. The device of claim 13, wherein the first logic gate is of a smaller physical size than the second logic gate.

16. The device of claim 13, further comprising polysilicon across the second section and the third section, wherein the polysilicon couples together electrical components of the second logic gate.

17. The device of claim 13, wherein each of the first logic gate and the second logic gate comprise at least one of an inverter, an AND gate, a NAND gate, or an OR gate.

18. The device of claim 13, wherein the first logic gate or the second logic gate comprise planar transistors.

19. The device of claim 13, wherein the first logic gate or the second logic gate comprise FinFet transistors.

20. A computer-implemented method of defining a circuit layout comprising a plurality of stacked rows, the computer-implemented method comprising:

defining, within a cell library comprising a stack triple height cell having the plurality of stacked rows, a first row comprising a first P-well and a first N-well, wherein a P-device of a first electrical component is formed in the first N-well;

defining, within the cell library, a second row beneath the first row, the second row comprising a second P-well and a second N-well, wherein an N-device of a second electrical component is formed within the first P-well and the second P-well;

defining, within the cell library, a third row beneath the second row, the third row comprising a third P-well and a third N-well, wherein a P-device of the second electrical component is formed within the second N-well and the third N-well and an N-device of the first electrical component is formed within the third P-well;

defining, within the cell library, a power rail or a ground rail at a top outer boundary of the first row, a boundary between the first row and the second row, a boundary between the second row and the third row, or a bottom outer boundary of the third row; and generating, using an electronic placement tool, the circuit layout comprising the first row, the second row, and the third row stacked on top of each other.

* * * * *